Aug. 4, 1931. J. J. N. VAN HAMERSVELD 1,817,724
INDICATING DEVICE
Filed April 10. 1930  8 Sheets-Sheet 1

Aug. 4, 1931.    J. J. N. VAN HAMERSVELD    1,817,724
INDICATING DEVICE
Filed April 10, 1930    8 Sheets-Sheet 8

Patented Aug. 4, 1931

1,817,724

UNITED STATES PATENT OFFICE

JOHN J. N. VAN HAMERSVELD, OF CLEVELAND HEIGHTS, OHIO, ASSIGNOR TO THE WARNER & SWASEY COMPANY, OF CLEVELAND, OHIO, A CORPORATION OF OHIO

INDICATING DEVICE

Application filed April 10, 1930. Serial No. 443,162.

This invention relates to a combined control and indicating device and has special utility when applied to certain movable members of a machine, such as the slide of a machine tool and the like, although it is not necessarily confined thereto as will be explained presently, as it has utility when used with any type of machine having movable members, the rate of movement of which is to be controlled and indicated.

The arrangement on the head of the machine of the control members or levers for the work spindle forms no part of the invention covered by the present application but constitutes the subject matter of a copending application of John J. N. Van Hamersveld Serial No. 514,649, filed February 9, 1931.

This invention is applicable to various types of machines such, for example, as a machine tool wherein one or more control members are required for manipulating the speed change mechanism, the object of the invention being to provide combined control and indicating means which controls the rate of movement of a certain part or parts of the machine and also directly and visibly indicates the rate of such movement.

A further object is to provide a centralized control for the rate of movement of a movable member of a machine such as a machine tool or the like.

A still further object is to provide in connection with such centralized control a visible indicating means to facilitate the setting of the actuating mechanism of the movable member to obtain various rates of movement of such member.

A further object is to accomplish the above mentioned result by means of one or more indicating members forming a part of the control members and so arranged that the movement of the control members will automatically position such indicating member or members in various relationships as to visibly indicate in a direct way the rate of movement of the movable member of the machine.

Another object of the invention is to provide a combined control and indicating device wherein the setting of the indicating device automatically controls the setting of the actuating mechanism for the movable member of the machine to impart to such member the rate of movement indicated by the indicating device.

The above and other objects are attained by the present invention which may be briefly summarized as consisting in certain novel combinations and arrangements of parts and details of construction which will be described in the specification and set forth in the appended claims.

In the accompanying sheets of drawings the invention is illustrated as applied to a turret lathe.

Although the invention is not confined in its use to a lathe or to a slide thereof, but may be used to advantage on movable members of other types of machines, it is especially useful, as stated above, when applied to one or more slides of a lathe and for that reason is so illustrated herein.

Figure 1:
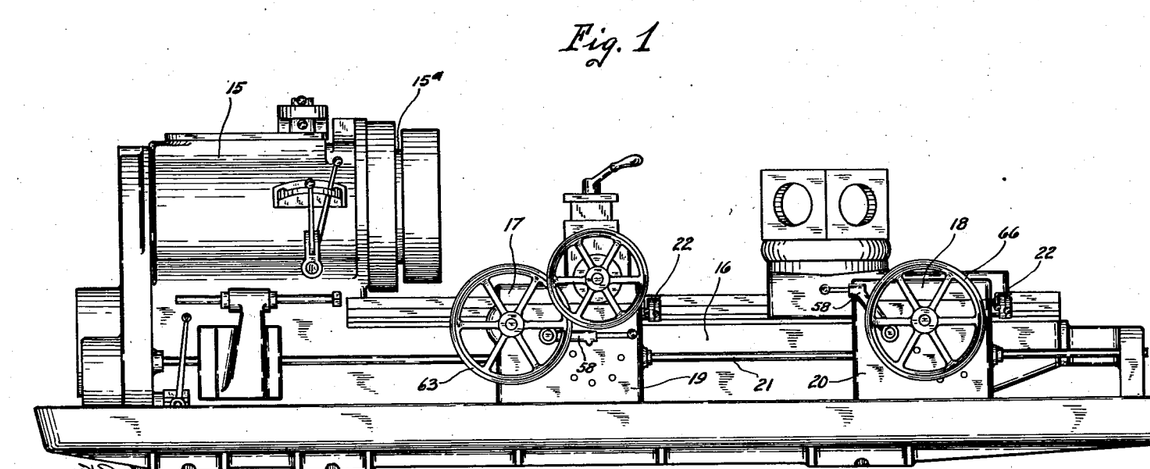
Figure 1 is a side elevational view of the turret lathe showing two movable members or slides to which the invention is applicable.

Referring to the drawings, a turret lathe is shown in side elevation in Fig. 1, which lathe has the usual head 15, supporting a work spindle 15ª, and a bed 16 provided with the usual ways upon which slide the cross-slide carriage 17, and turret saddle 18. The cross-slide carriage and turret saddle are provided with aprons 19 and 20 which extend downwardly from the carriage and saddle alongside the bed 16, the usual mechanism for feeding the slides along the ways of the bed, such mechanism being operated by the shaft 21 that extends alongside the bed and having a geared relation to the work spindle 15ª in the head. It will be seen from Fig. 1 that the usual control levers or knobs on the front side of the aprons for controlling the mechanism for moving the slide are eliminated and that their place is taken by an indicating device which automatically controls the setting of the slide actuating mechanism, such indicating device in this instance being shown at the right-hand side of the aprons and having the reference numeral 22. It should be understood that although the indicating device is shown herein as arranged at the right-hand side of the aprons, that such device could be arranged with equal facility at any place convenient to the operator, such as the left-hand side of the apron or upon the top or upon the front of the apron. The manner in which the setting of the indicating device automatically manipulates the actuating mechanism for obtaining various rates of movement of the slide will become apparent hereinafter with the detailed description of the remaining figures of the drawings.

Figure 2:
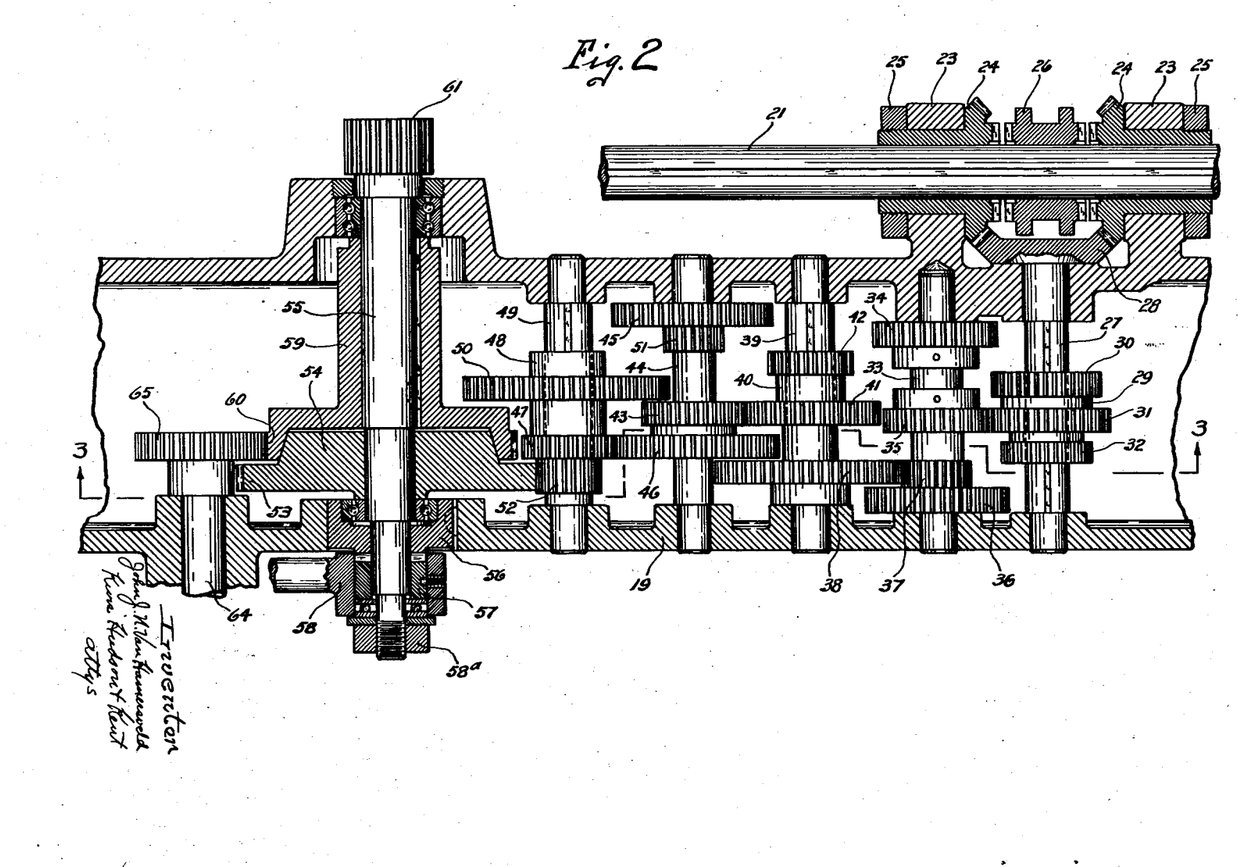
Fig. 2 is a horizontal sectional view through the apron of the slides shown in Fig. 1 and is taken substantially on irregular line 2—2 of Fig. 3, looking in the direction of the arrows.

Fig. 2 of the drawings is a horizontal sectional view through the apron 19 and shows the gear train and clutches arranged therein which forms the actuating mechanism for obtaining the various rates of movement of the slide, it being understood however that this actuating mechanism is well known in the art and does not form a part of the present invention, except in conjunction with the control of said mechanism by the combined control and indicating device. The shaft 21 that extends alongside the bed 16 of the machine is supported in the apron by bearings 23 which project from the inner side of the apron, such bearings rotatably supporting gears 24 having sleeve-like portions extending through the bearings 23 and secured in position by collars 25. The gears 24 and the shaft 21 are therefore arranged to have independent rotation. The gears 24 are provided on their inner face with clutch teeth adapted to be clutched to a clutch member 26 splined to the shaft 21 and moved so that either of the gears 24 may be clutched to and rotated with the shaft 21. The shifting of the clutch member 26 into engagement with one or the other of the gears 24 is of course to provide for a forward and reverse movement of the slide, and since the means for so shifting this clutch member does not form a part of the present invention it has not been shown herein. A shaft 27 extends transversely through the apron adjacent the clutch member and is provided at one end exteriorly of the apron with a gear 28 intermeshing with the gears 24. Within the apron a three-step gear cone 29 is splined on the shaft 27, this gear cone including the gears 30, 31 and 32. Another shaft 33 is supported by the apron and extends transversely thereof, such shaft being provided with gears 34, 35 and 36 adapted to be selectively meshed with gears 30, 31 and 32. In addition to the gears 34, 35 and 36 the shaft 33 supports a gear 37 which is arranged to be constantly in mesh with a gear 38 fixed upon a shaft 39 extending transversely of the apron and rotatably supported thereby. A two-step gear cone 40 is splined upon the shaft 39 and has the gears 41 and 42. When the gear cone 40 is in one position the gear 41 meshes with a gear 43 arranged upon a shaft 44 extending transversely of the apron, while when the gear cone 40 is in another position the gear 42 will mesh with a gear 45 arranged upon the shaft 44. The shaft 44 supports a gear 46 which is adapted to be meshed with a gear 47 forming a part of a two-step gear cone 48 splined upon a shaft 49. The other gear 50 of the two-step gear cone is adapted to be meshed with a gear 51 keyed on the shaft 44. The shaft 49 has fixed thereto a gear 52 which is constantly in mesh with a gear 53 formed on one of the members 54 of the friction clutch. This member 54 of the friction clutch is rotatably mounted on a shaft 55 extending transversely of the apron and is so arranged as to have a slight endwise movement thereon for engaging and disengaging the same with the other member of the friction clutch. The shaft 55 adjacent the front side of the apron is supported in a bearing member 56 likewise having a slight movement axially of the shaft, such bearing member contacting with the clutch member 54 so that when the bearing is moved the clutch member will be moved similarly. The forward side of the bearing member 56 cooperates with a cam member 57 rotatably arranged on a portion of the shaft 55 extending outwardly of the bearing member, whereby when the lever 58 secured to the cam member is rocked the cam member will cause an inward movement of the bearing member 56 and clutch member 54 axially of the shaft so that such clutch member will grip with the other clutch member 59 arranged upon the shaft 55. An adjusting nut 58$^a$ is provided to adjust the position of the lever 58 and cam member 57 upon the shaft 55 to cause a greater or lesser gripping of the clutch. The clutch member 59 has an elongated sleeve-like portion keyed to the shaft 55 and a head portion with which a portion of the member 54 cooperates, such head portion likewise being provided with a gear 60. When the clutch members 54 and 59 are in engagement the shaft 55 is rotated, which in turn rotates a pinion 61 arranged upon the end of the shaft between the inner side of the apron and the bed of the machine, such pinion meshing with a rack 62 fixed to the bed beneath the front way of the machine, (see Fig. 3), thereby effecting mechanical movement of the slide in both directions, depending upon the direction of rotation of the pinion. When the clutch members 54 and 59 are disengaged, thus disconnecting the power drive, manual movement of the slide may be effected through the hand-wheel 63 (see Fig. 1) arranged upon the outer end of the shaft 64 (see Fig. 2) which carries on its inner end pinion 65 meshing with the gear 60 of the clutch member 59. It should be understood that the apron 20 contains a similar gear train and actuating mechanism with the exception that in this apron the hand-wheel 66 is arranged in a different location than the hand-wheel 63 in the apron 19 for purposes of convenience, thereby necessitating a different location for the pinion 65 and shaft 64. The location of the shaft 64 and the pinion 65 in the apron 20 is indicated in Fig. 3 by dotted lines by the numerals 64$^a$ and 65$^a$, and in Fig. 4 by full lines.

From the foregoing description it will be seen that the pinion 61 meshing with the rack 62 may be rotated at twelve different speeds to thus provide twelve different rates of movement for the slide, these twelve different speeds being obtainable by the shifting of the three-step cone 29 into three driving positions, the two-step cone 40 into two driving positions and the two-step cone 48 also into two driving positions. The usual spring detents to hold the levers and gear cones in their operative positions have not been illustrated as they are well known in the art.

Figure 3:
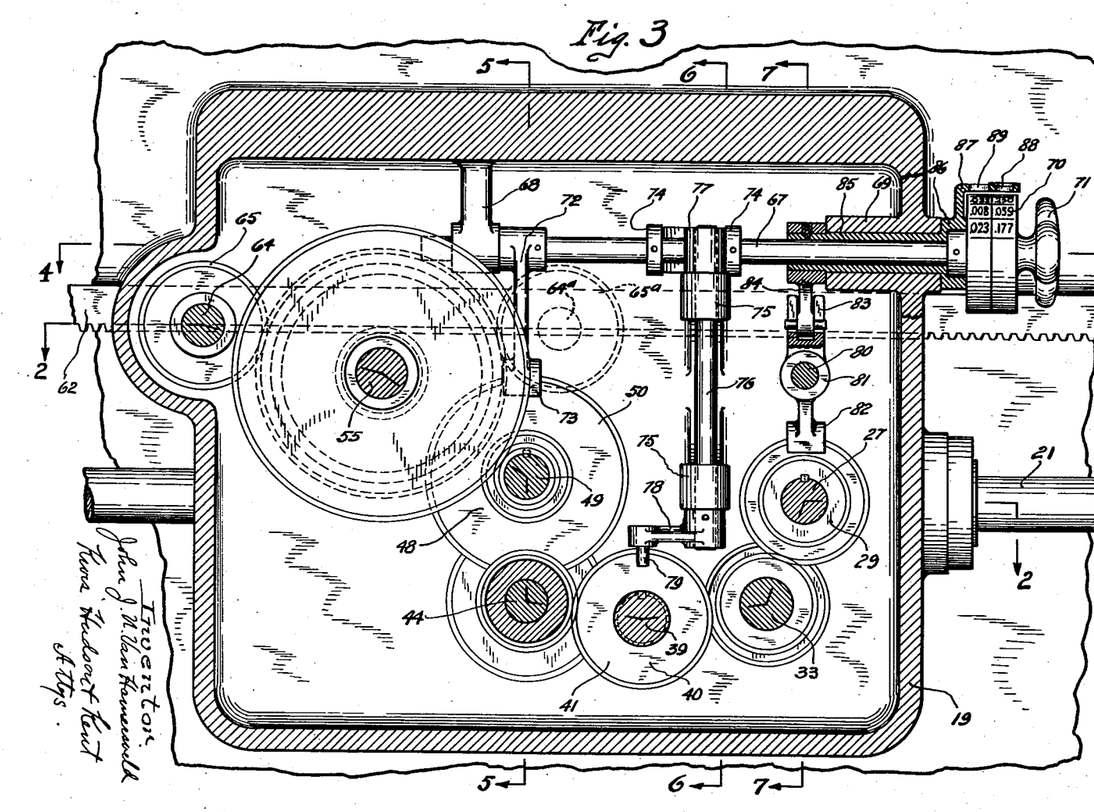
Fig. 3 is a vertical sectional view through the apron of the slides and is taken substantially on irregular line 3—3 of Fig. 2, looking in the direction of the arrows.
Figure 4:
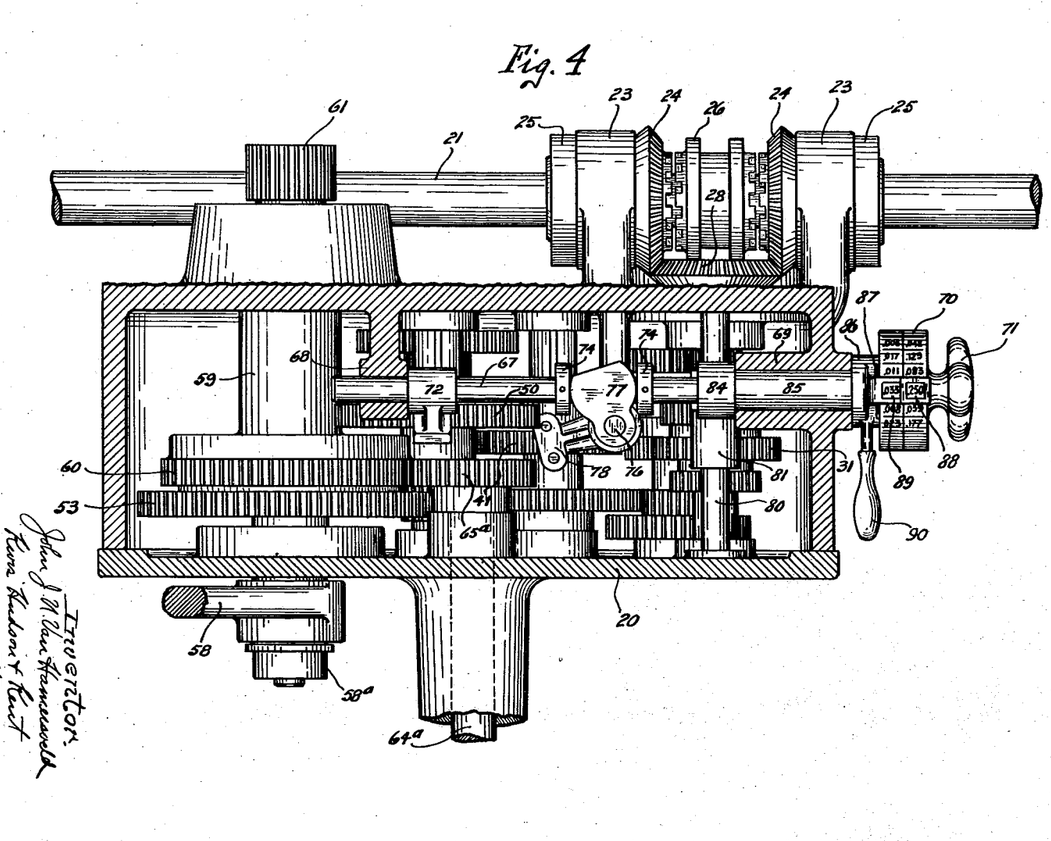
Fig. 4 is a horizontal sectional view through the apron taken on line 4—4 of Fig. 3, looking in the direction of the arrows with certain parts in elevation and the manual drive arranged as in the apron of the right hand slide of Fig. 1.

While I have disclosed herein, and particularly in Figs. 2 and 3, an actuating mechanism employing the three gear cones capable of obtaining twelve different rates of movement for the slide, it should be understood that this specific arrangement is merely illustrative and that the actuating mechanism may be varied in different ways so as to obtain a greater or lesser number of rates of movement of the slide.

The mechanism for indicating the rate of movement of the slide and for automatically shifting the gear cones to different driving positions so as to obtain such indicated rate of movement will now be described: A shaft 67 (see Fig. 3) extends inwardly of the apron and is supported therein for both axial movement and rotative movement in a downwardly projecting bracket 68 formed on the under side of the top of the apron, and in a bearing boss 69 formed on the side of the apron. The shaft 67 at its outer end is provided with a drum 70 having arranged on the circumference thereof rows of indicia representing, in this instance, the rate of movement of the slide in thousandths of an inch per revolution of the work spindle of the lathe. The shaft 67 is also provided at its outer end with a knob 71 by which the operator of the machine may rotate the shaft or move the same endwise.

A downwardly extending arm 72 (see Figs. 3 and 5) is fixed upon the shaft 67 just inwardly of the bearing bracket 68 and has a forked portion 73 at its lower end straddling the gear 50 of the gear cone 48, whereby when the knob 71 is rotated in the desired direction the shaft 67, and likewise the arm 72 will be correspondingly rocked with the result that the forked portion 73 of the arm will shift the gear cone 48 in the desired direction so as to mesh either the gear 50 with the gear 51 on the shaft 44 or the gear 47 with the gear 46 on the shaft 44. The shaft 67 is provided intermediate the arm 72 and the boss 69 with a pair of spaced collars 74, such collars being fixed to the shaft.

Figure 5:
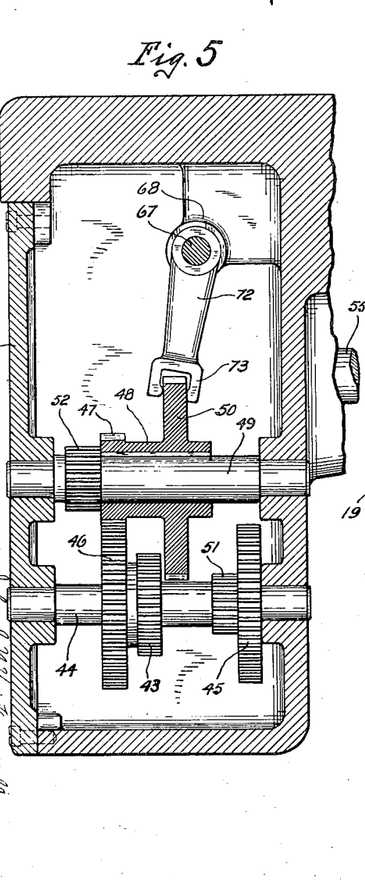
Fig. 5 is a vertical sectional view through the apron taken on line 5—5 of Fig. 3, looking in the direction of the arrows.
Figure 6:
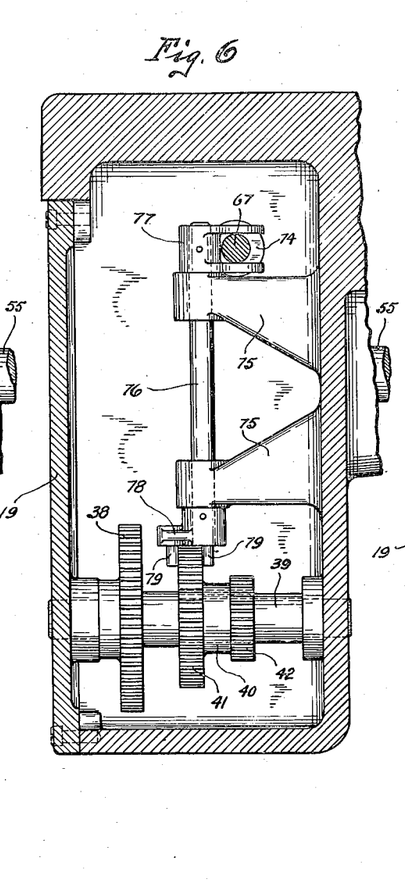
Fig. 6 is a vertical sectional view through the apron taken on line 6—6 of Fig. 3, looking in the direction of the arrows.
Figure 7:
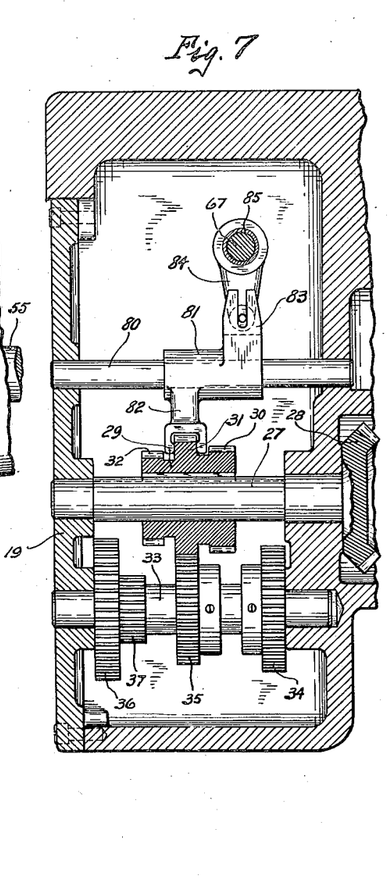
Fig. 7 is a vertical sectional view through the apron taken on line 7—7 of Fig. 3, looking in the direction of the arrows.

The inner side of the rear wall of the apron is provided with a pair of spaced bearing arms 75 projecting into the interior of the apron and rotatably supporting a vertically arranged shaft 76, which shaft has fixedly arranged on its upper end a forked lever 77 straddling the shaft 67 between the collars 74 so as not to interfere with the rocking of said shaft. The opposite edges of each arm of the forked lever 77 are in engagement with the adjacent faces of the collars 74, so that when the shaft 67 is moved endwise the lever 77 and the shaft 76 will be rocked by such endwise movement of the shaft 67. The lower end of the shaft 76 has fixed thereto a lever arm 78 having at its outer end two pins 79 which straddle the gear 41 of the gear cone 40 with the result that rocking movement of the shaft 76 shifts the gear cone 40 to bring the gear 42 into mesh with the gear 45 on the shaft 44, or the gear 41 into mesh with the gear 43 on the shaft 44. It will be noted that the shifting of the gear cone 48 is effected by the rotative movement of the shaft 67, while the shifting of the gear cone 40 is effected by the endwise movement of the shaft 67, both of these movements of the shaft being controlled by the manipulation of the knob 71 at the outer end of the shaft. It should also be noted that since the forked portion 73 of the arm 72 straddles the large gear 50 of the gear cone 48, the endwise shifting movement of the shaft 67 will not move the forked portion 73 of the arm 72 sufficiently to carry such portion out of its straddling relationship with respect to the gear 50.

The three-step gear cone 29 is shifted to its three driving positions namely, to have the gears 30, 31 and 32 thereof selectively meshed with the gears 34, 35 and 36, respectively, on the shaft 33 by a mechanism now to be described. A shaft 80 is supported by the apron and extends transversely thereof above the shaft 27 for the purpose of slidably supporting a sleeve-like member 81 having adjacent one end thereof a downwardly extending yoke arm 82, the forked portion of which straddles the gear 31 of the gear cone 29 and also having adjacent its other end an upwardly extending yoke arm 83 between the tines of the forked portion of which extends the arm of a lever 84, the lower end of such arm carrying a transversely extending pin which engages in the slots of the yoke arm 83. The upper end of the lever arm 84 surrounds a sleeve 85 and is secured thereto for movement therewith, this sleeve 85 being rotatably arranged on the shaft 67 and supported in the bearing boss 69 intermediate such boss and the shaft. The outer end of the sleeve 85 is provided with an annular flange portion 86 lying between the outer end of the boss 69 and the drum 70. The annular flange portion 86 has integrally formed thereon a substantially L-shaped arm 87 extending upwardly and over the periphery of the drum 70, that portion of the L-shaped arm 87 that is arranged above the periphery of the drum being provided at its outer end with an opening or window 88, and also with a second opening 89 adjacent the window or opening 88 but inwardly thereof to enable the operator to see the adjacent indicia of the other row of indicia. In the form shown in Figs. 1 to 9 the annular flange-like portion 86 of the sleeve 85 is provided with an outwardly projecting handle 90 for the purpose of rotating or rocking the sleeve 85 to bring the window into registration with the desired number of indicia of the rows of indicia arranged on the periphery of the drum and, in this instance, representing the movement of the slide in thousandths of an inch per revolution of the work spindle of the lathe. It will be seen that when the sleeve 85 is rocked by the lever 90 to position the window over the desired indicia the lever 84 fixed to the sleeve will be correspondingly rocked, and since the pin carried by the lower end of the arm 84 engages in the slot of the yoke arm 83 of the member 81 this member will be moved endwise of the shaft 80, such movement in turn shifting the three-step gear cone 29 through the intermediary of the downwardly extending yoke arm 82 straddling the gear 31. It will be seen from the foregoing description, and also from reference to Fig. 12 of the drawings that the sleeve 85 will be rocked to three different positions, corresponding to the positions which it is desired to shift the gear cone 29, and that the window 88 will move likewise to three different positions as indicated in Fig. 12 at 88, 88$^a$ and 88$^b$.

As previously stated, the circumference of the drum 70 is provided with rows of indicia corresponding to different rates of movement of the slide in thousandths of inches per revolution of the work spindle of the lathe, and in this instance the periphery of the drum 70 is provided with two parallel rows of such indicia, there being six indicia representing six rates of movements in each row, since the embodiment of the invention disclosed herein is arranged for twelve different rates of movement of the slide. However, it should be understood that this arrangement is illustrative, and that where a greater or lesser number of rates of movement of the slide are provided for the rows and the number of indicia will correspondingly be changed.

Figures 8, 9, 10, 11, 12, 13:
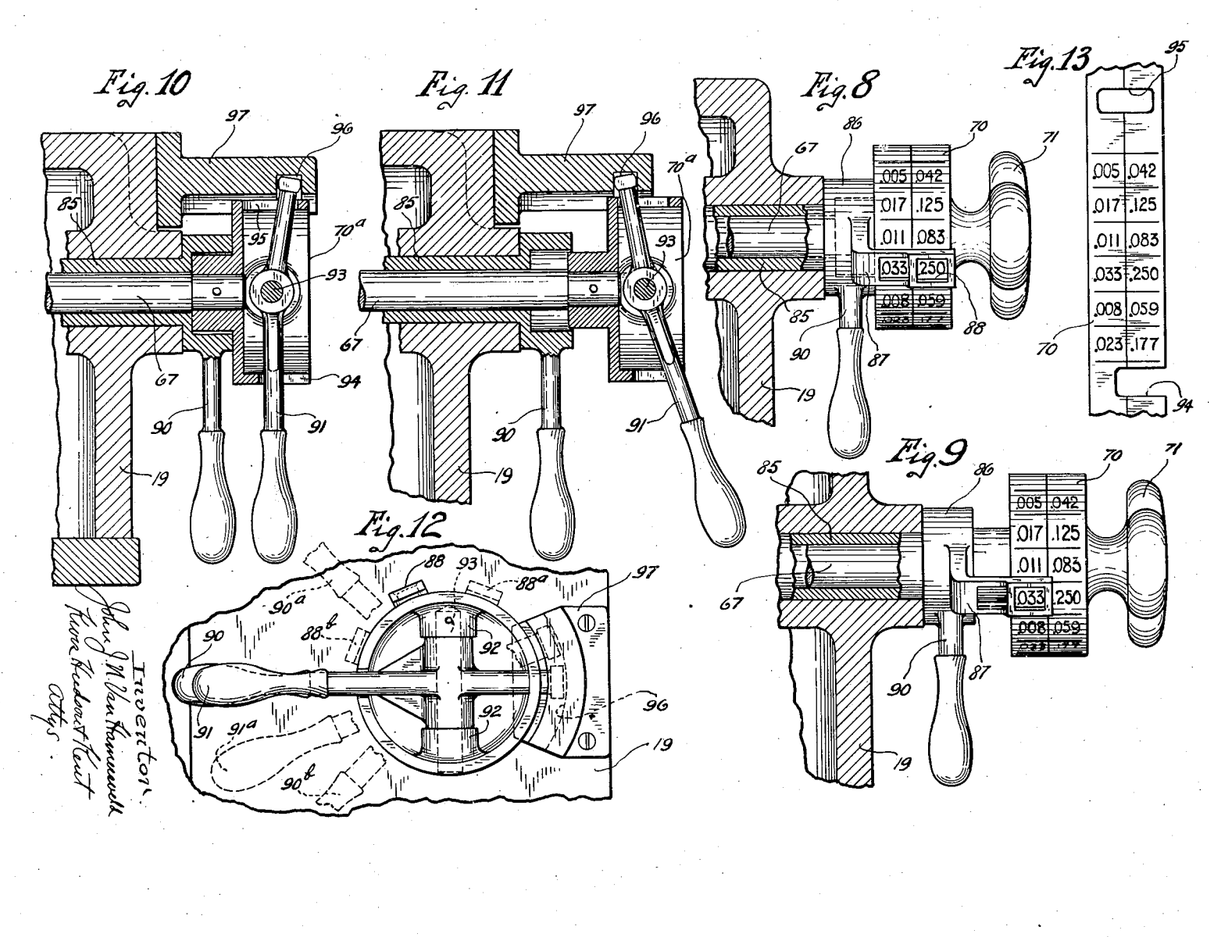
Fig. 8 is an enlarged fragmentary plan view of the combined control and indicating device, such view being similar to the right-hand portion of Fig. 4, and showing the relationship between the combined control and indicating members when the actuating mechanism for the movable member of the machine is set for one rate of movement.
Fig. 9 is a view similar to Fig. 8, the combined control and indicating members being in a relationship different from that shown in Fig. 8.
Fig. 10 is a view similar to Fig. 8 but showing a modified construction of the combined control and indicating device.
Fig. 11 is a view similar to Fig. 9 showing the combined indicating and control device of Fig. 10.
Fig. 12 is a fragmentary end elevation of the part shown in Figs. 10 and 11, the operating levers of the combined controlling and indicating members being indicated in a plurality of different positions by the solid and dotted lines.
Fig. 13 is a detail developed view showing part of the circumferential surface of one of the indicating members with the indicia thereon.

In order that the operation of the machine as so far described will be fully understood, reference is made to Fig. 8 wherein the window 88 is arranged over the indicia showing a rate of movement of .250 of an inch. When the indicating device is thus positioned the relationship between the gearing of the actuating mechanism is as illustrated in Fig. 2, and the window 88 is in the central position as shown in Fig. 12. Referring to Fig. 2, it will be seen that the gear 31 of the three-step cone 29 is in mesh with the gear 35 on the shaft 33 and that the gear 41 of the two-step cone 40 is in mesh with the gear 43 on the shaft 44 and that the gear 47 of the two-step cone 48 is in mesh with the gear 46 on the shaft 44. Now supposing it is desired to change the rate of movement to .033" (see Fig. 9), the operator by pulling out the knob 71 moves the shaft 67 endwise and brings the indicia .033 beneath the window 88. This endwise movement of the shaft 67 will result in rocking the shaft 76 and shifting the two-step gear cone 40 to a position wherein the gear 42 thereof will mesh with the gear 45 on the shaft 44.

The rate of movement now being at .033", and it being desired to change such rate of movement to .011", (see Fig. 9) the operator rotates the knob 71 in an anti-clockwise direction and in turn the drum 70 to bring the indicia .011 beneath the window 88, which movement of the drum automatically effects the proper change in the actuating mechanism, since the shaft 67 and the lever 72 are correspondingly rocked in an anti-clockwise direction, such movement shifting the two-step gear cone 48 so as to bring the gear 50 into mesh with the gear 51 on the shaft 44.

The rate of movement now being at .011", and it being desired to change the rate of movement to .008", the operator rocks the lever 90 to the position 90$^b$ which rocks the sleeve 85 in an anti-clockwise direction to bring the window 88 above the indicia .008, and to position 88$^b$ as shown in Fig. 12, whereupon the lever 84 is correspondingly rocked and the member 81 moved endwise of the shaft 80, thus shifting the three-step gear cone 29 to bring the gear 30 thereof into mesh with the gear 34 on the shaft 33.

The rate of movement now being at .008", with the lever 90 in position 90$^b$ and the window in the position 88$^b$ as shown in Fig. 12, and it being desired to obtain a rate of movement of .005", the operator rocks the handle 90 to position 90$^a$ which rocks the sleeve 85 in a clockwise direction to bring the window over the indicia .005 and to the position 88$^a$ as shown in Fig. 12, which movement of the sleeve will cause, through the member 81, a shifting of the three-step gear cone 29 to a position wherein the gear 32 thereof will be in mesh with the gear 36 on the shaft 33.

It will be seen from the foregoing description that rocking of the sleeve 85 to bring the three-step gear cone 29 from one operative position to another will move the window 88 the equivalent of two indicia spaces, whereas the rocking movement of the drum 70 to shift the two-step gear cone 48 from one operative position to another will rotate the drum the equivalent of one indicia space. It will also be seen that endwise movement of the shaft 67 to shift the two-step gear cone 40 to one or the other of its two operative positions will bring one row or the other of the two rows of indicia below the window 88.

Although the construction of the combined indicating and control device heretofore described is applicable to any type or size machine, it may be in some instances difficult in the larger type of machines to shift and rock the drum by a hand knob due to the size of the gears in the actuating mechanism within the apron. Therefore, in order to facilitate the shifting and rocking of the drum in these instances, a slightly modified form of construction may be employed, which form is illustrated in Figs. 10 to 12 of the drawings. In this form of construction the sleeve 85 is the same as in the previously described form, while the drum 70$^a$ is substantially the same as the drum 70 with the exception that in place of the knob 71 a shifting lever 91 is employed for the purpose of rocking the drum and shaft or for moving the drum and shaft endwise. In order to provide for this shifting lever the drum 70$^a$ has a pair of diametrically oppositely arranged bosses 92 within the same (see Fig. 12), which bosses support a bearing pin 93 and upon which the lever 91 is pivoted. The lever 91 has two portions extending from the point of its pivotal connection on the pin 93, one of which projects outwardly of the drum through an inwardly extending slot 94 (see Fig. 10) arranged in the periphery of the drum, this portion forming the handle end of the lever. The other portion of the lever extends through a slot 95 likewise formed in the periphery of the drum but terminating inwardly of the outer edge thereof, and the outer end of this portion of the lever engages in an arcuate groove 96 formed in the inner side of a bracket 97 secured to the side of the apron. Referring to Fig. 12, it will be seen that when the lever 91 is rocked from the position shown in full lines to the position 91$^a$ shown in dotted lines, the drum will be rocked in an anti-clockwise direction equivalent to one indicia space. It will also be seen that the drum and the shaft may be shifted endwise by swinging the lever 91 on its pivot, as for example from the position shown in Fig. 10 to the position shown in Fig. 11. Since the end of the lever engages in the groove 96 of the bracket 97 this swinging movement of the lever will result in moving the drum endwise in either an outward or an inward direction, according to the movement imparted to the lever, whereby one or the other rows of indicia will be positioned beneath the window 88. The operation of this last described form of combined indicating and control device is of course the same as the device previously described, although it will be seen that because of the increased leverage provided by the use of the lever the rocking and endwise movement of the drum may be accomplished with greater ease of operation.

Figure 14:
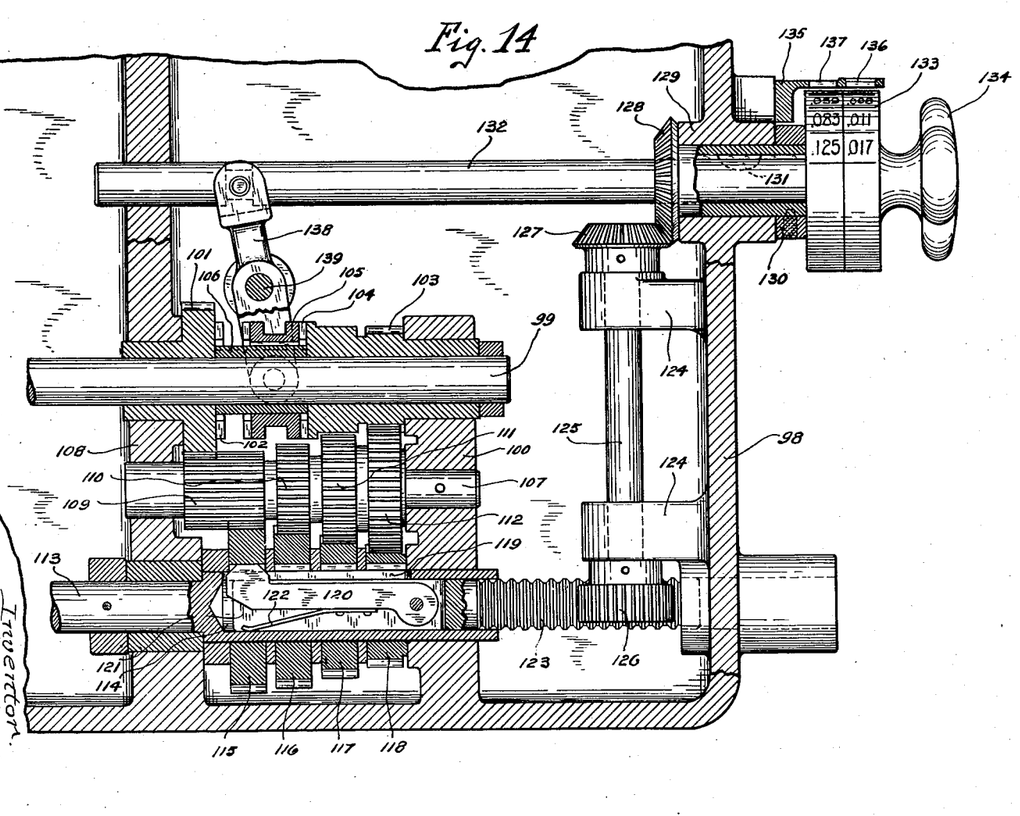
Fig. 14 is a vertical sectional view through the apron of a modified embodiment of the invention.

In order to illustrate more clearly that the present invention is applicable to various modified forms of machines having a greater or lesser number of different rates of movement than the machine previously described, and particularly with reference to the smaller type of machines in which a fewer number of rates of movement for the slide may be required, I have illustrated in Fig. 14 a modified embodiment of the invention. In this form the apron is shown at 98 and supports in suitable bearings a shaft 99 which may be clutched in any suitable way to the main drive shaft of the machine for forward or reverse rotation to cause forward or reverse movement of the slide. The shaft 99 is supported intermediate its ends in a bearing formed in a supporting rib 100 projecting upwardly from the bottom of the apron, while a gear 101 is rotatably supported on the shaft adjacent another rib 108 arranged within the apron, this gear being provided with clutch teeth 102. A second gear 103 is rotatably arranged on the shaft 99 between the gear 101 and the rib 100, this gear 103 having a sleeve-like portion extending toward the gear 101 and provided on its face with clutch teeth 104. A double-face clutch 105 is splined upon a sleeve 106 fixed on the shaft 99 intermediate the adjacent faces of the gear 101 and the gear sleeve 103 and forming a shoulder against which such faces of the gears abut. It will thus be seen that the clutch member 105 may be shifted into driving engagement with either of the gears 101 or 103 to thereby have either of said gears driven by the shaft 99. A counter-shaft 107 is fixedly mounted in the ribs 100 and 108 within the apron and rotatably supports a cluster gear having in this instance four gears namely, gears 109, 110, 111 and 112. The gear 109 of the cluster gear is in mesh with the gear 101, while the gear 112 of the cluster gear is in mesh with the gear 103, whereby it will be seen that this cluster gear may be rotated at two different speeds, depending upon the engagement of the clutch 105 with the gear 101 or the gear 103. A shaft 113 is rotatably supported in the apron in the bearing ribs 100 and 108 and drives through suitable gearing a pinion carried by the apron and in mesh with a rack on the bed in a similar manner to the pinion 61 and racks 62, this shaft intermediate the ribs being provided with a bore 114. There are four gears in the form of disks rotatably arranged on the bored portion of the shaft 113, these gears being indicated at 115, 116, 117 and 118 and separated from each other and from the rib 108 by suitable spacers. These gears 115, 116, 117 and 118 mesh respectively with gears 109, 110, 111 and 112 of the cluster gear. Each of the gears 115, 116, 117 and 118 are provided with keyways which cooperate with a longitudinal slot 119 formed in the bored portion 114 of the shaft 113 to allow a finger key 120 to pass through the slot and into the keyways of the various gears when properly positioned in relation thereto. The key 120 is pivotally mounted in a slot formed in the end of the member 121 projecting into the bore 114 of the shaft and is urged outward by a spring 122. The member 121 is provided with a circular rack 123 which rack is for the purpose of moving the member 121 endwise to bring the key in registration with the different keyways in the gears 115, 116, 117 and 118. It will be seen that when the member 121 is moved endwise the key 120 will first be depressed by its engagement with the spacers between said gears, after which it will be free to enter the keyway in another gear of the four gears when the keyway therein comes into alignment with the key to engage the same and cause the gear to rotate with the shaft 113. The member 121 is slidably supported at its end adjacent to the circular rack 123 in an opening in a boss formed on the end wall of the apron. A pair of vertically spaced bearing brackets or arms 124 extend inwardly of the apron from the inner side of the end wall and rotatably support a shaft 125 having at its lower end a pinion 126 meshing with the circular rack 123, and at its upper end a gear 127 in turn meshing with a gear 128 having a sleeve-like portion extending through a bearing boss 129 formed in the end wall of the apron. The sleeve-like portion is provided on its outer end with a fixed collar 130, which collar together with the gear 128 maintains the sleeve in proper position in the boss 129. The sleeve is provided with a keyway within which is arranged a key 131 carried by the shaft 132, such shaft being rotatable with the sleeve and slidable endwise in a bearing formed in the rib 108 and in the sleeve of the gear 128. The shaft 132 carries outwardly of the apron a drum 133, such drum being provided with two rows of indicia in the forms previously described but, of course, containing only four indicia in each row. The shaft 132 is also provided with a knob 134 by which the shaft and the sleeve may be rotated, or the shaft may be moved endwise. A bracket 135 is secured to the end wall of the apron and has an arm projecting over the periphery of the drum, such arm being provided adjacent its outer end with a window 136 and also inwardly of the window with an opening 137. A lever 138 is fulcrumed at 139 within the apron and intermediate the ends of the lever and is provided on its opposite ends with yoke portions having an operative association with the shaft 132 and with the clutch 105, so that when the shaft 132 is moved endwise by the endwise movement of the knob and drum, the lever 138 will be swung to shift the clutch 105 into engagement with the clutch teeth of the gear 101 or the gear 103, thus causing the gear 101 or the gear 103 to be driven by the shaft 99, and in turn to drive the cluster gear at two different speeds. Since the cluster gear may be driven at two different speeds and in turn drives the shaft 113 through any one of the four gears 115, 116, 117 and 118, depending upon which of these gears is keyed to the shaft the slide will have eight different rates of movement.

It will also be seen that when the knob 134 is rotated to rotate the drum, the shaft 132, the sleeve, the gear 128, and the shaft 125 will be rotated and the pinion 126 carried at the lower end thereof will, through the rack 123, move the member 121 endwise so as to disengage the key 120 from the keyway in which it happens to be and into a position where it may snap into engagement with the keyway of any of the other gears. The endwise movement of the shaft 132 and the drum 133 places one or the other of the two rows of indicia beneath the window 136, while rocking movement of the shaft and drum sufficient to shift the key 120 from one gear to the next gear moves the drum a distance equivalent to one indicia space, whereby the movement of the drum to bring the desired indicia beneath the window will automatically result in the shifting of the key from the position in which it was originally into a position in which the proper gear for obtaining that rate of movement will be keyed to the shaft 113.

From the foregoing it will be seen that a single member serves to indicate and also to automatically control the operation of the slide to obtain eight different rates of movement thereof, and that a number of different arrangements with gearing could be used whereby this single indicating and control member would indicate and control the operation of the slide when adapted to have a greater or lesser number of rates of movement.

Figure 15:
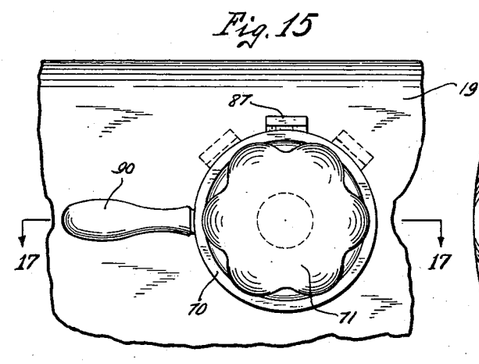
Fig. 15 is a fragmentary detail front elevation of a combined control and indicating device arranged upon the front of the apron.
Figure 16:
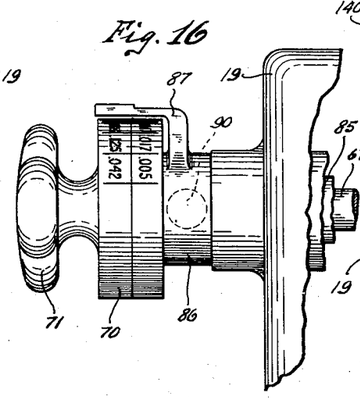
Fig. 16 is a fragmentary side elevation of the device shown in Fig. 15.
Figure 17:
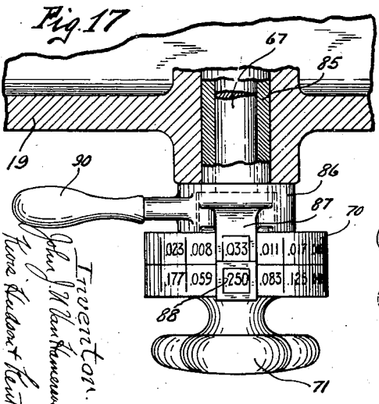
Fig. 17 is a horizontal sectional view taken on line 17—17 of Fig. 15 looking in the direction of the arrows, certain parts being in elevation.

The combined indicating and control device shown in Figs. 15 to 17 inclusive is substantially the same as that shown in Figs. 8 and 9 and the shiftable and rockable shaft and the rockable sleeve are connected to the gear cones in substantially the same way. However, this combined control and indicating device is arranged upon the front of the apron and in order to facilitate the reading of the indicia the characters comprising the indicia of the two rows of indicia are so arranged as to be in the proper position to be read from the front of the apron.

Figure 18:
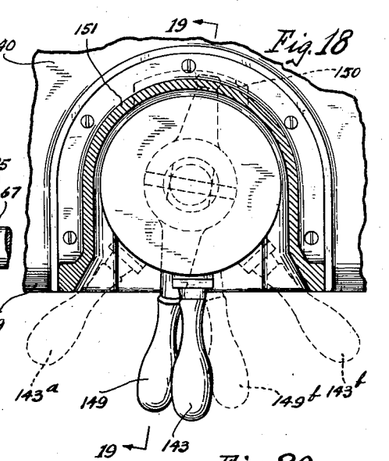
Fig. 18 is a fragmentary top plan view of the combined control and indicating device modified for arrangement upon the top of the apron, the cover plate for the device being shown in section.
Figure 19:
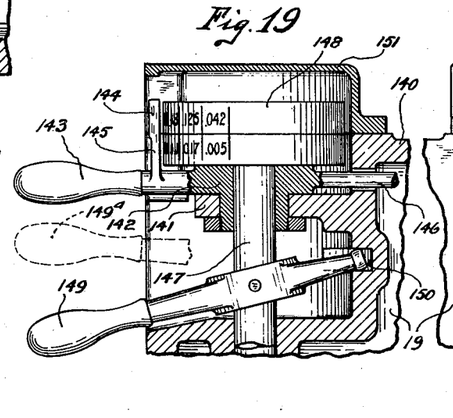
Fig. 19 is a vertical sectional view taken substantially on line 19—19 of Fig. 18.
Figure 20:
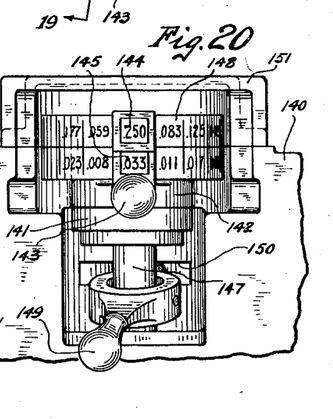
Fig. 20 is a front elevational view of the combined control and indicating device shown in Fig. 18.

In Figures 18 to 20 inclusive the top of the apron is indicated at 140, while the apron adjacent the forward upper edge of its front face and substantially midway of its ends, is provided with a cored portion (see Fig. 19) formed so that a bearing arm 141 projects forwardly in the cored portion substantially midway thereof. A rockable sleeve 142 is supported in an opening in the arm 141 and is provided with an operating handle 143 projecting beyond the cored portion and the front face of the apron, such handle in turn being provided with an upwardly extending portion having a window 144 in its upper end and an opening 145 below the window. The sleeve 142 is also provided with an arm 146 (see Fig. 19), projecting inwardly of the apron and suitably connected to the three-step gear cone of the mechanism for the slide in a manner substantially corresponding to the connection between the sleeve 85 and the actuating mechanism, as shown in Fig. 3 of the drawings.

A vertically extending shaft 147 is supported in the sleeve 142 for endwise and rocking movements, it being understood that this shaft 147 is suitably connected at its lower end to the two two-step gear cones in a substantially similar way as the shaft 67 shown in Fig. 3. The shaft 147 is provided at its upper end with a drum 148, upon the periphery of which is arranged two rows of indicia, as in the drums of the forms previously described, so that there will always be one of the rows of indicia behind the window 144, irrespective of the endwise movement which has been given to the shaft 147. An operating lever 149 is pivotally connected to the shaft 147 (see Fig. 18), and has its inner end extending into an arcuate groove 150 formed in the rear wall of the cored portion of the apron. When it is desired to move the shaft 147 endwise the operating lever 149 is rocked to the position 149ª, indicated in dotted lines in Fig. 19. When it is desired to rock the shaft 147 the operating lever 149 is moved from the full line position to the position 149ᵇ, shown in dotted lines in Fig. 18. The handle 143 of the sleeve 142 is moved to the positions 143ª and 143ᵇ, as shown by dotted lines in Fig. 18, when it is desired to shift the three-step gear cone and to move the window 144 the equivalent of two indicia spaces on the drum in either direction from the position shown in full lines in Fig. 18. The operation of this embodiment of the invention is the same as that set forth in connection with the previously described forms, and particularly with reference to the forms shown in Figs. 10 to 12 inclusive, and therefore need not be described in greater detail. It might be stated, however, that the indicia forming the two rows of indicia on the drum 148 is positioned in a different manner from the indicia in the modification shown in Figs. 10 to 12, the positioning of the indicia in this last described modification corresponding in fact to the indicia arrangement shown in Fig. 17.

A substantially U-shaped cover 151, open at the front of the apron and substantially circular at its rear end, is secured upon the top of the apron in order to cover the indicating device to exclude chips and dirt therefrom and to protect the same.

It will be seen that in all of the forms hereinbefore described a centralized control is provided for the slide, since when the operator moves the indicating devices, namely, the indicia carrying drum and the window, to such relative positions as will bring the indicia corresponding to the desired rate of movement of the slide in thousandths of an inch per revolution of the work spindle beneath the window, this positioning of the indicia carrying drum and the window will automatically control the actuating mechanism for the slide to effect the desired rate of movement thereof.

It will be seen from the above that my invention is susceptible of numerous modifications in the arrangement and manner of mounting the indicating members, and that while I have shown certain forms of the invention, I do not wish to be limited to any of the embodiments illustrated, but aim in my claims to cover all modifications which do not involve a departure from the spirit and scope of the invention.

Having thus described my invention what I claim is:

1. In combination, a device for indicating the rate of movement of a part of a machine, and means for actuating said part at various rates of movement, said device including a member indicating the rate of movement of said part and capable of a linear movement, said linear movement of said member controlling said means.

2. In combination, a device for indicating the rate of movement of a part of a machine, and means for actuating said part at various rates of movement, said device including a member indicating the rate of movement of said part and capable of both a rocking movement and a linear movement, said movements of said member controlling said means.

3. In combination, a device for indicating the various rates of movement of a part of a machine, and means for moving said part, said device having a member indicating the rate of movement of said part and connected with said means, said member being capable of a linear movement to control said means.

4. In combination, a device for indicating the various rates of movement of a part of a machine, and means for moving said part, said device including a member connected with said means, said member being capable of a linear movement and a rocking movement to indicate the various rates of movement of said part and to control said means.

5. In combination, a device for indicating the various rates of movement of a part of a machine, and means for moving said part, said device including relatively movable members indicating the various rates of movement of said part, one of said members being capable of a linear movement and a rocking movement to control said means.

6. In combination, a device for indicating the various rates of movement of a part of a machine, and means for moving said part, said device including relatively movable members one of which has a window and another of which carries indicia to indicate the rate of movement of said part, one of said members being connected with said means and capable of a linear movement and a rocking movement to control said means.

7. In combination with a machine having a plurality of movable members which are operatively connected with one another, a device for indicating the rate of movement of one of the members in relation to the rate of movement of another of said members, and means for moving said first mentioned member at various rates, said device controlling said means.

8. In combination with a machine having rotatable and slidable members which are operatively connected with one another, a device for indicating the rate of movement of a slidable member in relation to the rate of rotation of a rotatable member, and means for moving said slidable member at various rates, said device being connected with said means and controlling the same.

9. In combination with a machine having two movable parts which are operatively connected with each other, a device for indicating the rate of movement of one of said parts with relationship to the rate of movement of the other part, and means for moving said part having said device, said device including a movable member connected with said means and controlling the same.

10. In combination with a machine having a plurality of movable parts which are operatively connected with one another, a device for indicating the rate of movement of one of the parts in relation to the rate of movement of another of said parts, and means for moving said first mentioned part at various rates, said device including a movable member connected with said means and controlling the same.

11. In combination with a machine having rotatable and slidable parts which are operatively connected with, a device indicating the rate of movement of a slidable part in relation to the rate of rotation of a rotatable part, and means for moving said slidable part at various rates, said device including a movable member connected with said means and controlling the same.

12. In combination with a machine having two relatively movable parts which are operatively connected with each other, a device for indicating the rate of movement of one of the parts with relationship to the rate of movement of the other part, and means for moving that part whose movement is indicated by said device, said device having a member connected with said means and movable in a plurality of directions to control the same.

13. In combination with a machine having two relatively movable parts which are operatively connected with one another, a device to indicate the rate of movement of one of said parts with relationship to the rate of movement of the other part, and means for moving that part the movement of which is indicated by said device, said device having a member connected with said means and capable of a rocking movement to control said means.

14. In combination with a machine having a plurality of movable parts which are operatively connected with one another, a device for indicating the rate of movement of one of said parts in relation to the rate of movement of another of said parts, and means for moving said first mentioned part at various rates, said device having a member connected with said means and capable of a rocking movement to control the same.

15. In combination with a machine having rotatable and slidable parts which are operatively connected with one another, a device for indicating the rate of movement of a slidable part in relation to the rate of rotation of a rotatable part, and means for moving said slidable part at various rates, said device having a member connected with said means and capable of rocking movement to control the same.

16. In combination with a machine having a plurality of movable parts which are operatively connected with one another, a device for indicating the rate of movement of one of the parts in relation to the rate of movement of another of said parts, and means for moving said first mentioned part at various rates, said device having a member connected with said means and capable of a rocking and an endwise movement to control the same.

17. In combination with a machine having rotatable and slidable parts which are operatively connected with one another, a device for indicating the rate of movement of a slidable part in relation to the rate of rotation of a rotatable part, and means for moving said slidable part at various rates, said device having a member connected with said means and capable of a rocking and an endwise movement to control the same.

18. In combination with a machine having two relatively movable parts which are operatively connected with each other, a device to indicate the rate of movement of one of said parts in its relation with the rate of movement of the other part, and means for moving said first mentioned part at various rates, said device having a member connected with said means and capable of a rocking and an endwise movement to control the same.

19. In combination, a device arranged on the slide of a machine for indicating the rate of movement thereof, and means for actuating said slide at various rates of movement, said device controlling said means.

20. In combination, a device arranged on the slide of a machine for indicating the rate of movement thereof, and means for actuating said slide at various rates of movement, said device being connected with said means and controlling the same.

21. In combination, a device arranged on the slide of a machine for indicating the rate of movement thereof, and means for actuating said slide at various rates of movement, said device having a movable member indicating the rate of movement of said slide the movement of said member controlling said means.

22. In combination, a device arranged upon the slide of a machine for indicating the rate of movement thereof, and means for actuating said slide at various rates of movement, said device having a member indicating the rate of movement of said slide and movable in a plurality of directions to control said means.

23. In combination, a device arranged upon the slide of a machine to indicate the rate of movement thereof and means for actuating said slide at various rates of movement, said device having a member indicating the rate of movement of said slide and connected with said means, said member being capable of a rocking movement to control said means.

24. In combination, a device arranged upon the slide of a machine to indicate the rate of movement thereof, and means for actuating said slide at various rates of movement, said device including a member indicating the rate of movement of said slide and capable of endwise movement to control said means.

25. In combination, a device arranged upon the slide of a machine for indicating the rate of movement thereof, and means for actuating said slide at various rates of movement, said device including a member indicating the rate of movement of said slide and capable of both a rocking movement and an endwise movement, said movements of said member controlling said means.

26. In combination with the slide of a machine, means for moving said slide at various rates, and a centralized means arranged on said slide to control the same.

27. In combination, a device for indicating the various rates of movement of a part of a machine, and means for moving said part at different rates, said device comprising a plurality of movable members indicating the rate of movement of said part, the movement of said members controlling said means.

28. In combination, a device for indicating the various rates of movement of a part of a machine, and means for moving said part at various rates, said device comprising a plurality of movable members indicating the rate of movement of said part and each having a rocking movement to control said means.

29. In combination, a device for indicating the various rates of movement of a part of a machine, and means for moving said part at various rates, said device comprising a plurality of movable members for indicating the rate of movement of said part, one of said members having a rocking movement and the other of said members having a sliding movement to control said means.

30. In combination, a device for indicating the various rates of movement of a part of a machine, and means for moving said part at various rates, said device comprising a plurality of movable members indicating the rate of movement of said part, one of said members having a rocking movement and another of said members having a rocking and sliding movement, said movements of said members controlling said means.

31. In combination, a device for indicating the various rates of movement of a part of a machine, and means for moving said part at various rates, said device comprising a plurality of movable members one of which has a window and another of which carries indicia to indicate the rate of movement of said part, the movement of said members controlling said means.

32. In combination, a device for indicating the various rates of movement of a part of a machine, and means for moving said part at various rates, said device comprising two movable members one of which carries a window and the other of which carries indicia to indicate the rate of movement of said part, the window carrying member having a rocking movement and the indicia carrying member having a rocking and sliding movement, the movements of said members controlling said means.

33. In a machine, in combination, a movable part, means for moving said part at various rates, and a device operatively connected with said means for controlling the same and for indicating the various rates of movement of said part, said device comprising two movable cooperating indicating members which are positioned to indicate the desired rate of movement of said part, the said positioning of said members controlling said means.

34. In combination, a device for indicating the various rates of movement of a part of a machine, and means for moving said part at various rates and operatively connected with said device, said device comprising members movable to indicate the desired rate of movement of said part, the movement of said members automatically controlling said means to obtain the desired rate of movement of said part.

In testimony whereof, I hereunto affix my signature.

JOHN J. N. VAN HAMERSVELD.